United States Patent
Hampton et al.

(10) Patent No.: US 9,534,704 B2
(45) Date of Patent: Jan. 3, 2017

(54) NOISE ATTENUATION IN A CHECK VALVE UNIT OR APPARATUS FOR PRODUCING VACUUM

(71) Applicants: Keith Hampton, Ann Arbor, MI (US); David E. Fletcher, Flint, MI (US); Brian M. Graichen, Leonard, MI (US); Rex Bravo, Detroit, MI (US); Matt Gilmer, Whitmore Lake, MI (US); Andrew Niedert, New Hudson, MI (US)

(72) Inventors: Keith Hampton, Ann Arbor, MI (US); David E. Fletcher, Flint, MI (US); Brian M. Graichen, Leonard, MI (US); Rex Bravo, Detroit, MI (US); Matt Gilmer, Whitmore Lake, MI (US); Andrew Niedert, New Hudson, MI (US)

(73) Assignee: DAYCO IP HOLDINGS, LLC, Troy, MI (US)

(*) Notice: Subject to any disclaimer, the term of this patent is extended or adjusted under 35 U.S.C. 154(b) by 0 days.

(21) Appl. No.: 14/509,612

(22) Filed: Oct. 8, 2014

(65) Prior Publication Data
US 2015/0096637 A1    Apr. 9, 2015

Related U.S. Application Data

(60) Provisional application No. 61/888,186, filed on Oct. 8, 2013, provisional application No. 61/913,756, filed on Dec. 9, 2013.

(51) Int. Cl.
*B01F 5/04* (2006.01)
*F16K 47/08* (2006.01)
(Continued)

(52) U.S. Cl.
CPC ............... *F16K 47/08* (2013.01); *F16K 15/00* (2013.01); *F16K 47/14* (2013.01); *Y10T 137/2185* (2015.04)

(58) Field of Classification Search
CPC .......... F16K 15/00; F16K 47/14; F16K 47/08; Y10T 137/2185
(Continued)

(56) References Cited

U.S. PATENT DOCUMENTS 2,037,884 A    4/1936  Day
2,626,009 A    1/1953  Sebok et al.
(Continued)

FOREIGN PATENT DOCUMENTS

CN    2400655       10/2000
CN    201907500     7/2011
JP    2009168134    7/2009

OTHER PUBLICATIONS

PCT, International Search Report and Written Opinion; Application No. PCT/US2015/033079 (Aug. 21, 2015).
(Continued)

*Primary Examiner* — Umashankar Venkatesan
(74) *Attorney, Agent, or Firm* — Thompson Hine LLP

(57) ABSTRACT

Check valve units having one or more sound attenuating members are disclosed. A check valve unit includes a housing defining an inlet port, an outlet port, and a chamber in fluid communication therewith thereby defining a flow path from the inlet port through the chamber to the outlet port. The chamber includes first and second valve seats and has a sealing member disposed therein that is moveable from a position seated on the first valve seat to a position seated on the second valve seat. A sound attenuating member is disposed in the flow path downstream of the chamber, within the chamber, or both. In another embodiment, the check
(Continued)

valve unit includes a Venturi portion in fluid communication with the chamber. The Venturi portion has a fluid junction with the flow path downstream of the chamber or forms the discharge section of the Venturi portion thereby defining the outlet port.

21 Claims, 8 Drawing Sheets

(51) Int. Cl.
*F16K 47/14* (2006.01)
*F16K 15/00* (2006.01)

(58) Field of Classification Search
USPC .......................................................... 137/895
See application file for complete search history.

(56) References Cited

U.S. PATENT DOCUMENTS

| | | | |
|---|---|---|---|
| 2,905,268 | A | 9/1959 | McMichael |
| 2,954,091 | A | 9/1960 | McMichael |
| 3,430,437 | A | 3/1969 | Saussele et al. |
| 3,581,850 | A | 6/1971 | Jaitl |
| 3,698,510 | A | 10/1972 | Blatt et al. |
| 3,826,281 | A | 7/1974 | Clark |
| 3,842,932 | A | 10/1974 | Gibel |
| 4,354,492 | A | 10/1982 | McPhee |
| 4,424,883 | A | 1/1984 | Musiani |
| 4,683,916 | A | 8/1987 | Raines |
| 4,893,654 | A | 1/1990 | Feuz |
| 4,938,309 | A | 7/1990 | Emdy |
| 4,951,708 | A | 8/1990 | Miller |
| 5,108,266 | A | 4/1992 | Hewitt |
| 5,291,916 | A | 3/1994 | Kloosterman et al. |
| 5,326,942 | A | 7/1994 | Schmid |
| RE37,090 | E | 3/2001 | Kloosterman et al. |
| 7,029,103 | B2 | 4/2006 | Iida |
| 7,610,140 | B2 | 10/2009 | Hirooka |
| 7,628,170 | B2 | 12/2009 | Kok-Hiong et al. |
| 7,673,653 | B2 | 3/2010 | Mijers et al. |
| 8,517,056 | B2 | 8/2013 | Cullin |
| 2002/0027041 | A1 | 3/2002 | Czabala et al. |
| 2005/0045417 | A1 | 3/2005 | Ni |
| 2005/0061378 | A1 | 3/2005 | Foret |
| 2005/0121084 | A1 | 6/2005 | Andersson |
| 2006/0016477 | A1 | 1/2006 | Zaparackas |
| 2008/0145238 | A1 | 6/2008 | Shibayama et al. |
| 2011/0132311 | A1 | 6/2011 | Pursifull et al. |
| 2011/0186151 | A1 | 8/2011 | Sparazynski |
| 2012/0024249 | A1 | 2/2012 | Fuhrmann et al. |
| 2013/0139911 | A1 | 6/2013 | Wilson et al. |
| 2013/0213510 | A1* | 8/2013 | Burnham ................ F16K 15/14 137/888 |
| 2014/0014080 | A1 | 1/2014 | Beshay et al. |
| 2014/0165962 | A1 | 6/2014 | Pursifull |

OTHER PUBLICATIONS

US, Non-Final Office Action; U.S. Appl. No. 14/565,075 (Nov. 16, 2015).
English translation of JP 07-117010, accessed Nov. 9, 2015, <https://www4.j-platpat.inpit.go.jp/cgi-bin/tran_web_cgi_ejje?u= http://www4.j-platpat.inpit.go.jp/eng/translation/20151110030429 33220791746924010100932AF2D1BD4629B19B03A22964BC2 FC8>.
PCT, International Search Report and Written Opinion, International Application No. PCT/US2014/059672 (Jan. 9, 2015).
PCT, International Search Report and Written Opinion, PCT/US2015/039950 (Oct. 5, 2015).
PCT, International Search Report and Written Opinion; Patent Application No. PCT/US2015/024195 (Jul. 24, 2015).
US, Final Office Action; U.S. Appl. No. 14/565,075; (Apr. 1, 2016).
CN, Search Report with English translation; Chinese Patent Application No. 201480001422.9; (Jul. 20, 2016).
CN, Office Action with English translation; Chinese Patent Application No. 201480001422.9; (Aug. 1, 2016).
US, Final Office Action; U.S. Appl. No. 14/600,598; (Aug. 19, 2016).
U.S., Non-Final Office Action; U.S. Appl. No. 14/565,075; (Jul. 21, 2016).

* cited by examiner

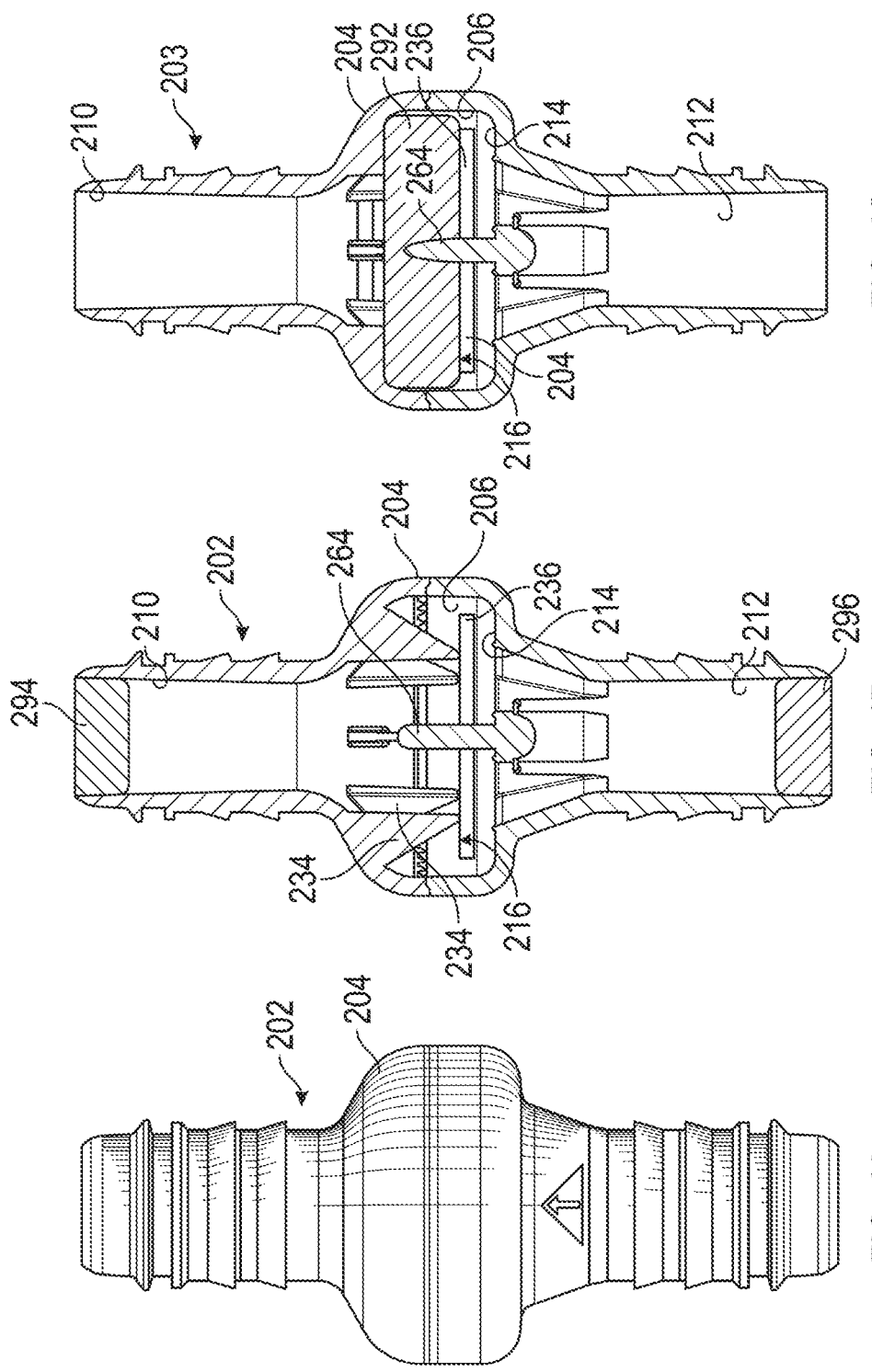

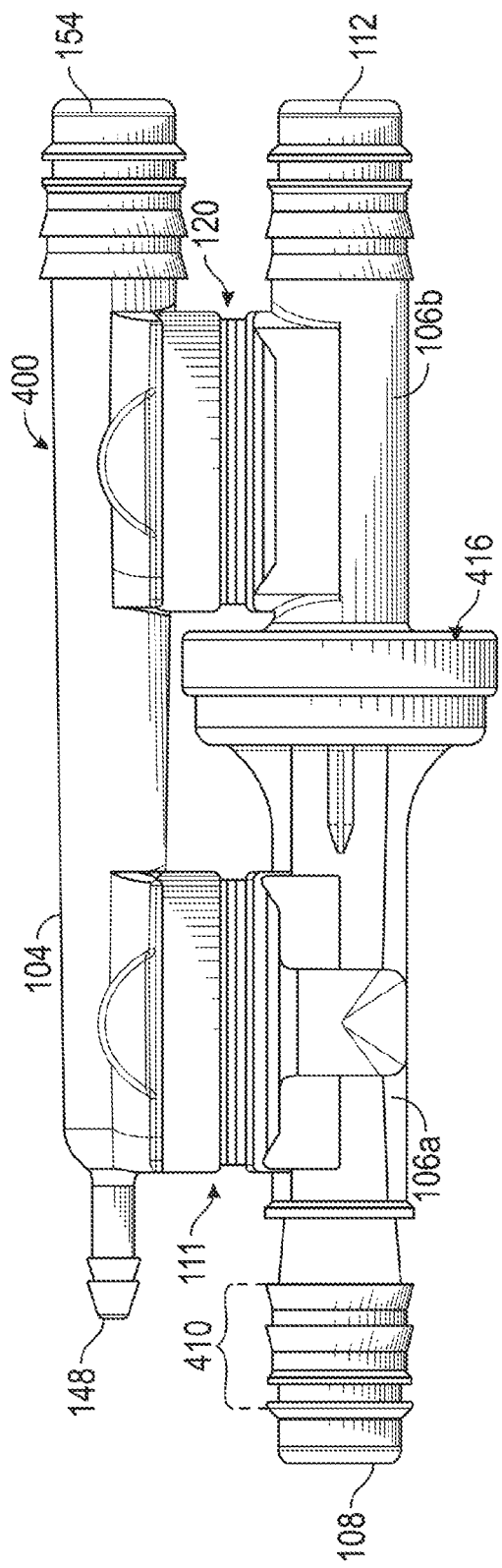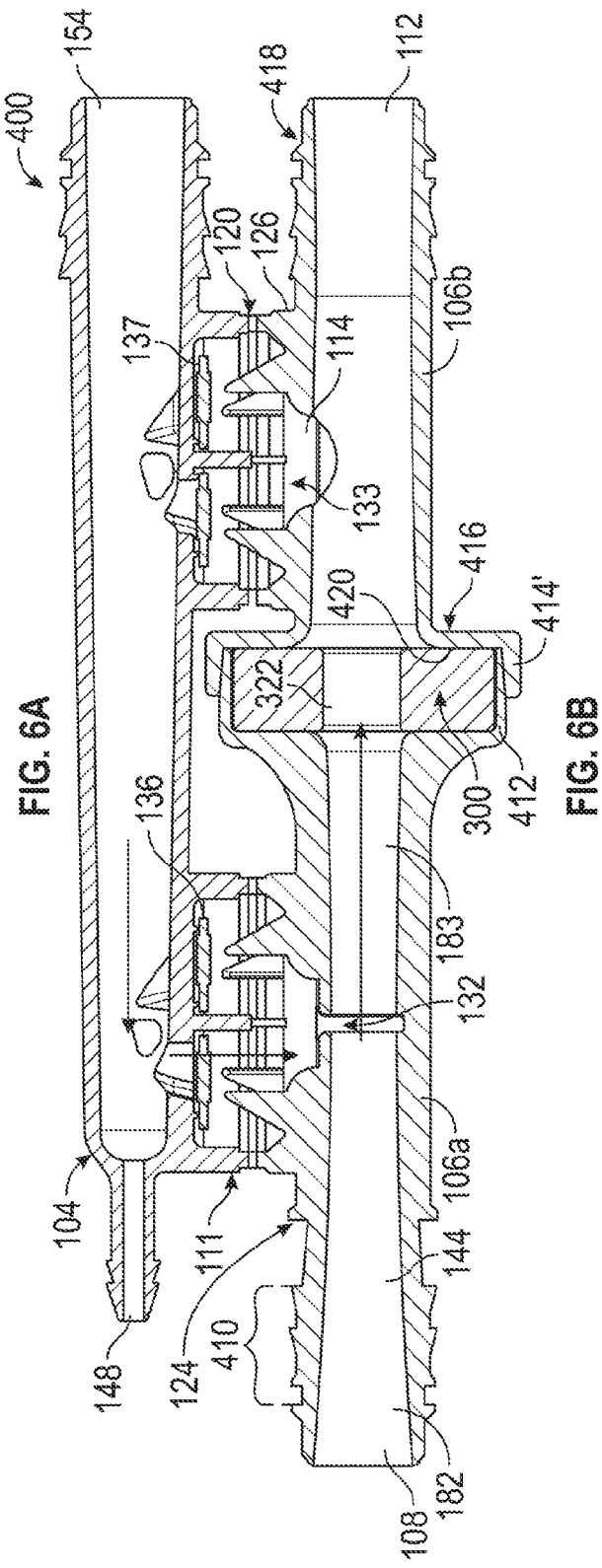

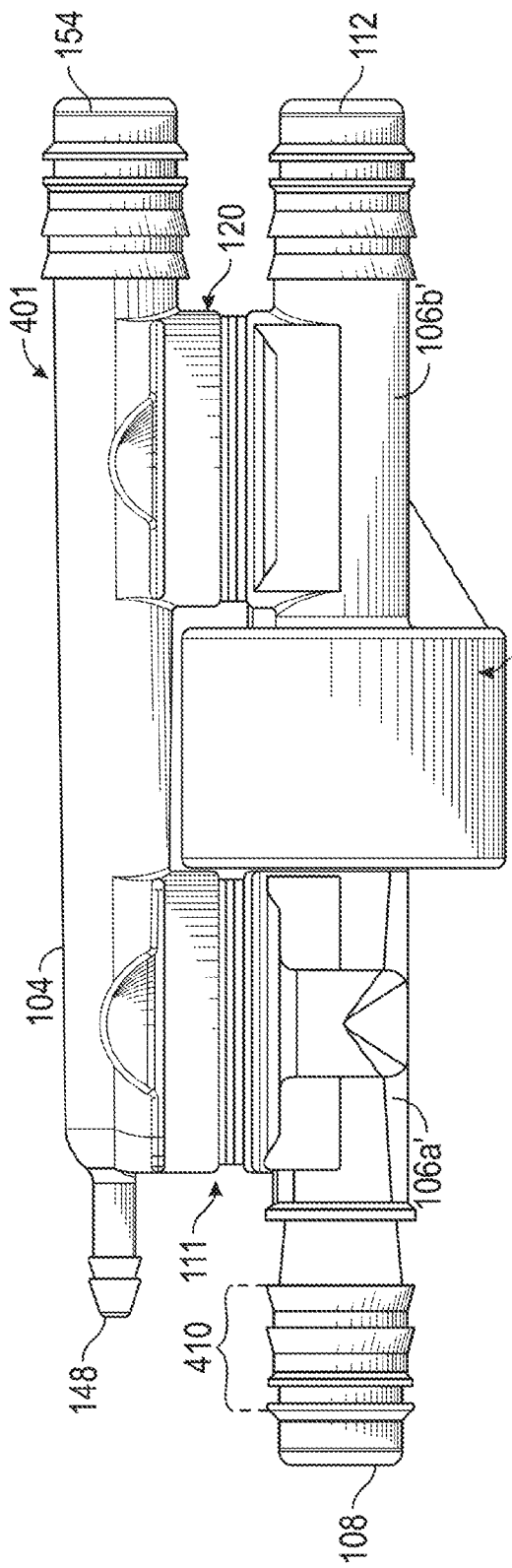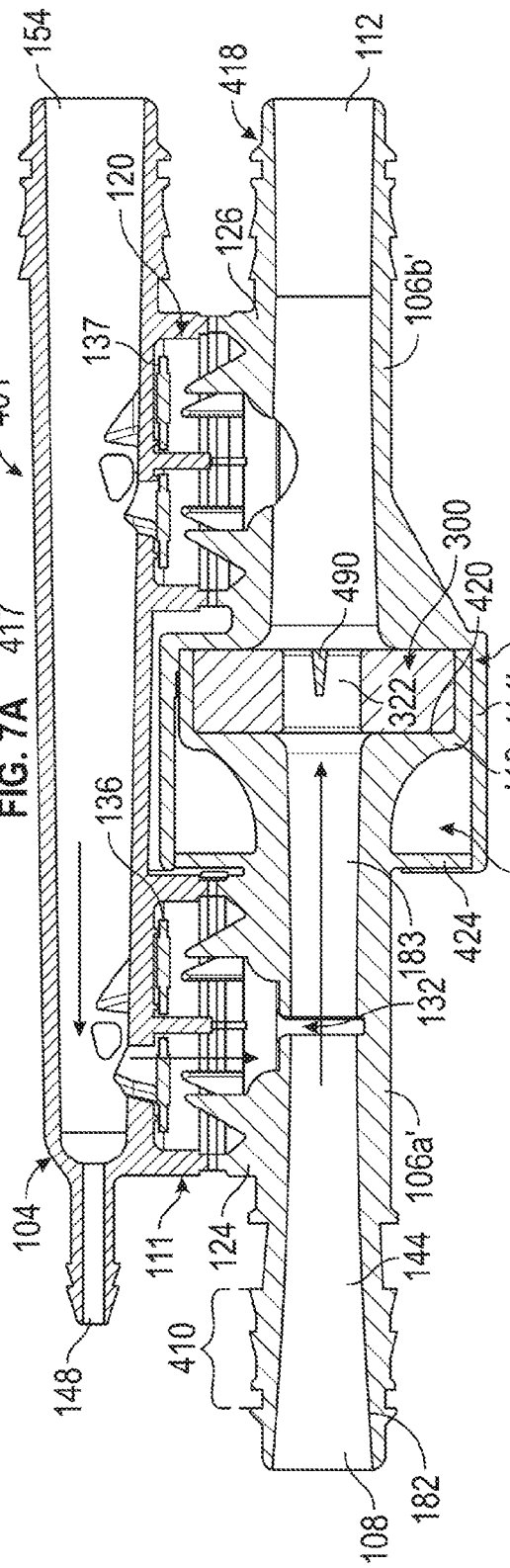

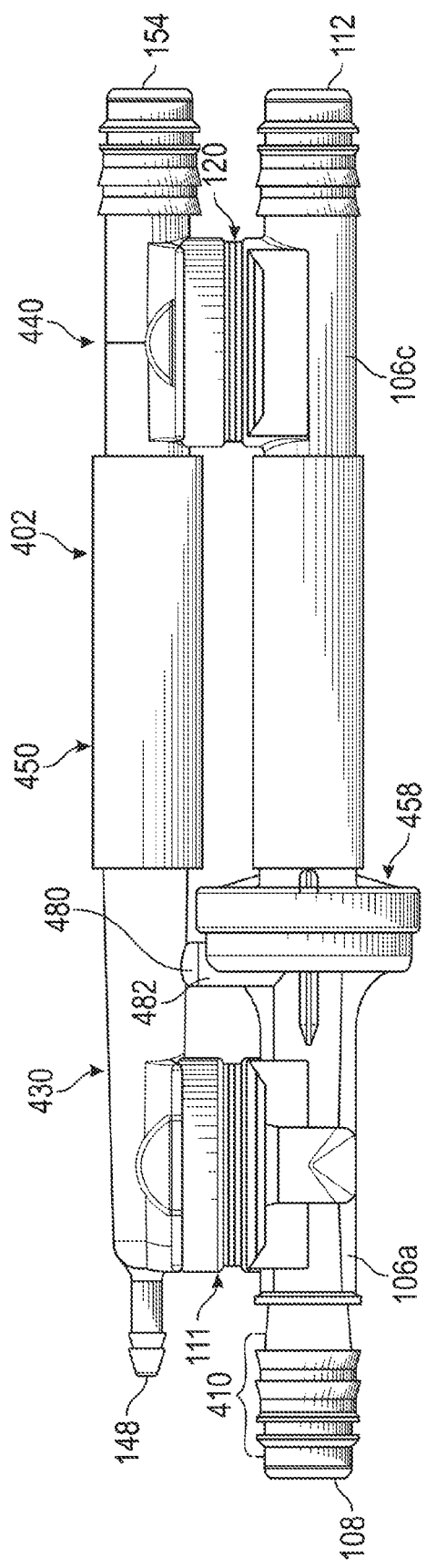

NOISE ATTENUATION IN A CHECK VALVE UNIT OR APPARATUS FOR PRODUCING VACUUM

RELATED APPLICATIONS

This application claims the benefit of U.S. Provisional Application No. 61/888,186, filed Oct. 8, 2013, and U.S. Provisional Application No. 61/913,756, filed Dec. 9, 2013.

TECHNICAL FIELD

This application relates to noise attenuation in an apparatus that produces vacuum using the Venturi effect and/or in check valves, more particularly to the inclusion of a porous member therein in a position downstream from the source of the noise.

BACKGROUND

Engines, for example vehicle engines, are known to include aspirators or ejectors for producing vacuum and/or check valves. Typically, the aspirators are used to generate a vacuum that is lower than engine manifold vacuum by inducing some of the engine air to travel through a Venturi. The aspirators may include check valves therein or the system may include separate check valves. When the check valves are separate they are typically included downstream between the source of vacuum and the device using the vacuum.

During most operating conditions of an aspirator or check valve the flow is classified as turbulent. This means that in addition to the bulk motion of the air there are eddies superimposed. These eddies are well known in the field of fluid mechanics. Depending on the operating conditions the number, physical size, and location of these eddies is continuously varying. One result of these eddies being present on a transient basis is that they generate pressure waves in the fluid. These pressure waves are generated over a range of frequencies and magnitudes. When these pressure waves travel through the connecting holes to the devices using the vacuum, different natural frequencies can become excited. These natural frequencies are oscillations of either the air or the surrounding structure. If these natural frequencies are in the audible range and of sufficient magnitude then turbulence generated noise may be heard under the hood and/or in the passenger compartment. Such noise is undesirable and new aspirators, ejectors, and/or check valves are needed to eliminate or reduce this type of noise.

SUMMARY

The various check valve units disclosed herein attenuate noise effectively, in particular during use in an internal combustion engine. In one embodiment, the check valve units include a housing defining an inlet port, an outlet port, and a chamber in fluid communication with the inlet port and the outlet port thereby defining a flow path from the inlet port through the chamber to the outlet port. The chamber has a first valve seat and a second valve seat and a sealing member disposed in the chamber that is moveable from a position seated on the first valve seat to a position seated on the second valve seat. To accomplish the sound attenuation, the check valve unit includes a sound attenuating member disposed in the flow path downstream of the chamber, disposed within the chamber, or both.

In each embodiment, the sound attenuating member includes a porous material that attenuates noise pressure wave by interference. Since the check valve units are sometimes used in an internal combustion engine, the sound attenuating member is heat resistant to temperatures experienced based on its placement within the internal combustion engine. In one embodiment, the sound attenuating member is a continuous plug of porous material. In other embodiments, the sound attenuating member has one or more bore holes passing therethrough that are generally aligned with the direction of the flow in the flow path.

In one check valve unit, a first sound attenuating member is disposed in the flow path proximate the inlet port and a second sound attenuating member is disposed in the flow path proximate the outlet port.

In another check valve unit, a first sound attenuating member is disposed in the chamber and forms either the first valve seat or the second valve seat and a second sound attenuating member is disposed in the flow path proximate the outlet port.

In yet another check valve unit, a Venturi portion has a fluid junction with the flow path downstream of the chamber which places the Venturi portion in fluid communication with the outlet port. Here, a first sound attenuating member is disposed in the flow path proximate the outlet port, and a second sound attenuating member is disposed in the flow path proximate the inlet port or is disposed in the chamber.

In yet another embodiment, a Venturi portion is in fluid communication with the chamber and a discharge section of the Venturi portion defines the outlet port of the chamber. Here, the sound attenuating member is disposed in the discharge section of the Venturi portion. Optionally, this embodiment may further include a second chamber having a second inlet port and a second outlet port in fluid communication therewith thereby defining a flow path from the inlet port through the chamber to the outlet port. The second chamber includes a first valve seat and a second valve seat and has a sealing member disposed therein that is moveable from a position seated on the first valve seat to a position seated on the second valve seat. When this second chamber is present, it may be called a bypass check valve. The outlet port of the second chamber has a fluid junction with the discharge section of the Venturi portion downstream of the sound attenuating member. Further, the discharge section may include a canister to house the sound attenuating member. The canister may include a first canister portion as part of the discharge section of the Venturi portion. The first canister portion defines a seat for the sound attenuating member and a second canister portion that is mated to the first canister portion encloses the sound attenuating member in a first chamber of the canister. In one embodiment, this canister is a dual chambered canister that forms a second chamber surrounding at least a portion of the discharge section of the Venturi portion upstream from the first chamber.

This summary highlights several embodiments of the check valve units disclosed herein. Many variations are provided in the detailed description below.

BRIEF DESCRIPTION OF THE DRAWINGS

FIG. 4A is a front perspective view of a check valve.

FIG. 4B is a longitudinal, cross-sectional view of the check valve of FIG. 4A.

FIG. 4C is a longitudinal, cross-sectional view of a second embodiment of a check valve having the exterior configuration shown in FIG. 4A.

FIG. 6A is a side, perspective view of a second embodiment of an aspirator for attenuating noise from turbulent air flow.

FIG. 6B is a side, longitudinal cross-sectional plan view of the aspirator of FIG. 6A.

FIG. 7A is a side, perspective view of a third embodiment of an aspirator for attenuating noise from turbulent air flow.

FIG. 7B is a side, longitudinal cross-sectional plan view of the aspirator of FIG. 7A.

FIG. 8A is a side, perspective view of a fourth embodiment of an aspirator for attenuating noise from turbulent air flow.

FIG. 8B is a side, longitudinal cross-sectional plan view of the aspirator of FIG. 8A.

DETAILED DESCRIPTION

Figure 1:
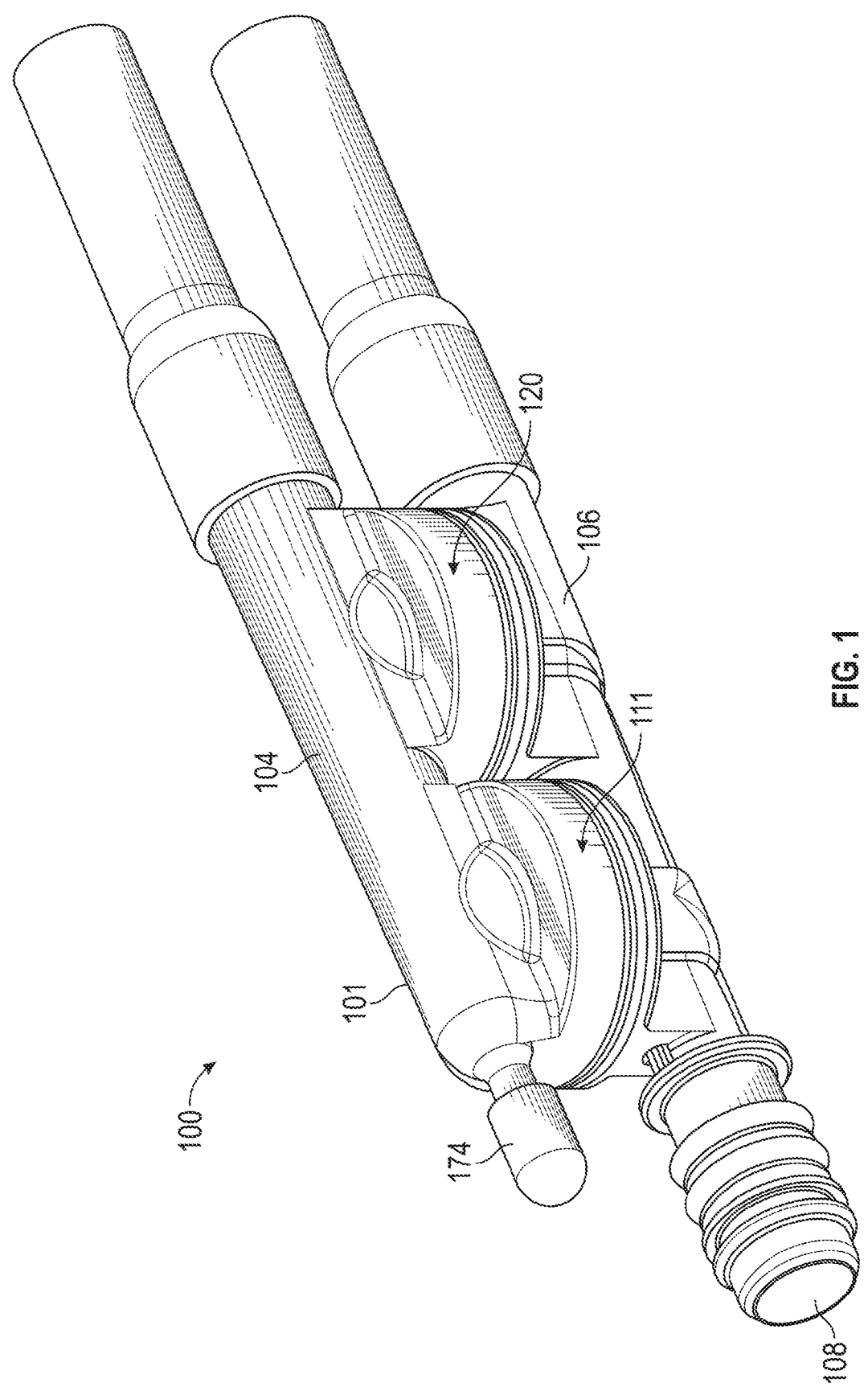
FIG. 1 is a side, perspective view of a first embodiment of an aspirator for attenuating noise from turbulent air flow.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

FIG. 1 is an external view of an aspirator-check valve assembly, generally identified by reference number 100, for use in an engine, for example, in a vehicle's engine. The engine may be an internal combustion, and the vehicle and or engine may include a device requiring a vacuum. Check valves and or aspirators are often connected to an internal combustion engine before the engine throttle and after the engine throttle. The engine and all its components and/or subsystems are not shown in the figures, with the exception of a few boxes included to represent specific components of the engine as identified herein, and it is understood that the engine components and/or subsystems may include any commonly found in vehicle engines. While the embodiments in the figures are referred to as aspirators herein because the motive port 108 is connected to atmospheric pressure, the embodiments are not limited thereto. In other embodiments the motive port 108 may be connected to boosted pressure, such as the pressures attributed to boosted air produced by a turbocharger and as such the "aspirator device" is now preferably referred to as an ejector.

Figure 2:
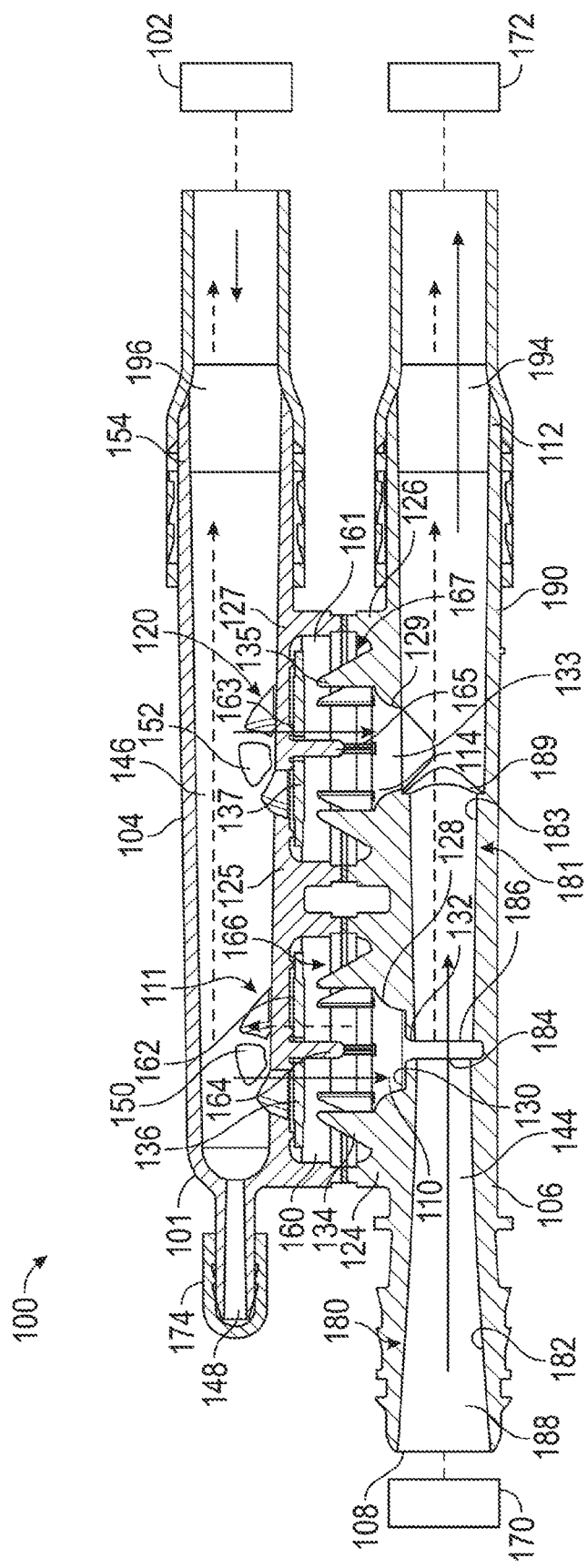
FIG. 2 is a side, longitudinal cross-sectional plan view of the aspirator of FIG. 1.
Figure 3:
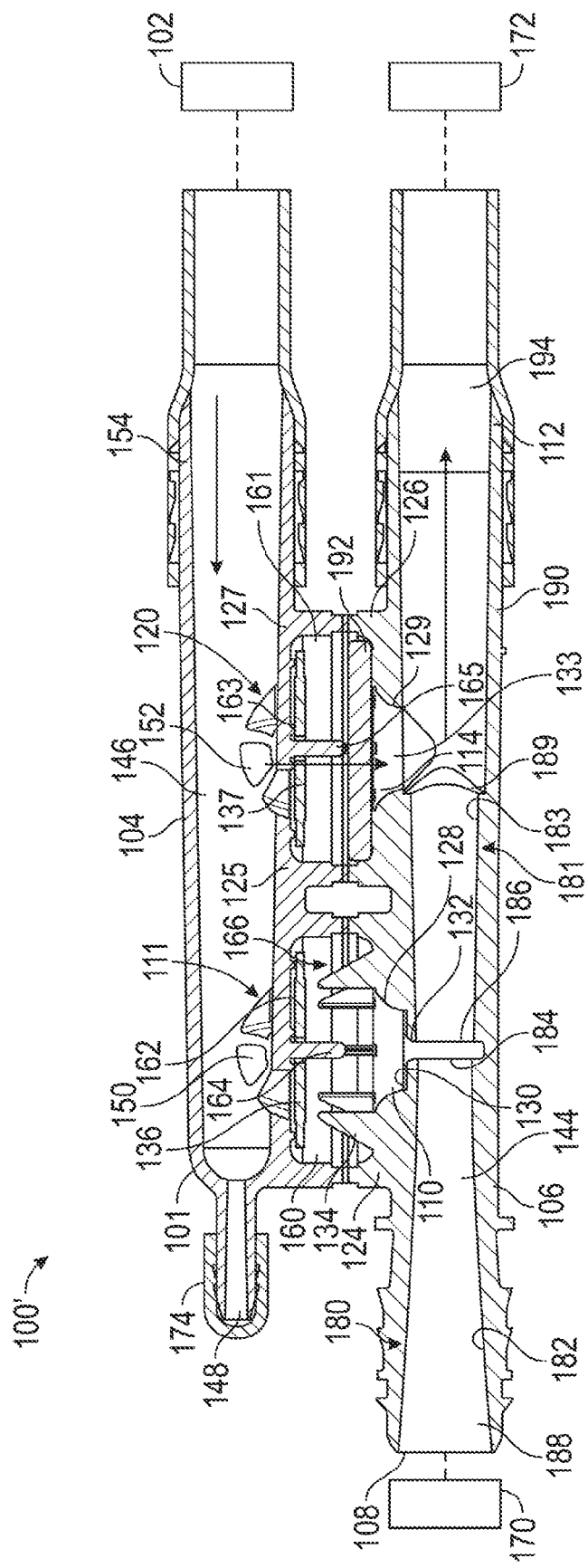
FIG. 3 is a side, longitudinal cross-sectional plan view of another embodiment of an aspirator for attenuating noise from turbulent air flow.

The aspirator-check valve assemblies disclosed herein may have alternate embodiments such as the embodiment of FIGS. 1 and 2 and the embodiment of FIG. 3 100, 100', respectively. Both aspirator-check valve assemblies 100, 100' are connectable to a device requiring a vacuum 102 and create vacuum for said device 102 by the flow of air through a passageway 144, extending generally the length of a portion of the aspirator-check valve assembly, designed to create the Venturi effect. The aspirator-check valve assemblies 100, 100' include housing 101, which as illustrated is formed of an upper housing portion 104 and a lower housing portion 106. The designations of upper and lower portions are relative to the drawings as oriented on the page, for descriptive purposes, and are not limited to the illustrated orientation when utilized in an engine system. Preferably, upper housing portion 104 is joined to lower housing portion 106 by sonic welding, heating, or other conventional methods for forming an airtight seal therebetween.

Still referring to FIGS. 1-3, the lower housing portion 106 defines passageway 144 which includes a plurality of ports, some of which are connectable to components or subsystems of the engine. The ports include: (1) a motive port 108, which supplies clean air from the engine intake air cleaner 170, typically obtained upstream of the throttle of the engine; (2) a suction port 110, which can connect via the check valve 111 to a device requiring vacuum 102; (3) a discharge port 112, which is connected to an engine intake manifold 172 downstream of the throttle of the engine; and, optionally, (4) a bypass port 114. Check valve 111 is preferably arranged to prevent fluid from flowing from the suction port 110 to the application device 102. In one embodiment, the device requiring vacuum 102 is a vehicle brake boost device. The bypass port 114 may be connected to the device requiring vacuum 102 and, optionally, may include a check valve 120 in the fluid flow path therebetween. Check valve 120 is preferably arranged to prevent fluid from flowing from the bypass port 114 to the application device 102.

As shown in FIGS. 2 and 3, lower housing portions 106 in both embodiments includes lower valve seats 124, 126. Each lower valve seat 124, 126 is defined by a continuous outer wall 128, 129, and, optionally, a bottom wall such as wall 130 in lower valve seat 124. A bore 132, 133 is defined in each lower valve seat 124, 126, respectively, to allow for air flow communication with air passageway 144. In FIG. 2, each lower valve seat 124, 126 includes a plurality of radially spaced fingers 134, 135 extending upwardly from an upper surface thereof. The radially spaced fingers 134, 135 serve to support a seal member 136, 137. In FIG. 3, only one of the lower valve seats, specifically lower valve seat 124 includes a plurality of radially spaced fingers 134. The second lower valve seat 126 includes a first sound attenuating member 192 rather than the plurality of radially spaced fingers. In another embodiment, not shown, both of the lower valve seats 124, 126 may include sound attenuating members rather than the plurality of radially spaced fingers.

Referring again to FIGS. 1-3, the upper housing portion 104 is configured for mating to or with the lower housing portion 106 to form the check valves 111, 120, if both are present. Upper housing portion 104 defines passageway 146 extending the length thereof and defines a plurality of ports, some of which are connectable to components or subsystems of the engine. The ports include: (1) a first port 148 that may be capped with cap 174 or may be connected to a component or subsystem of the engine; (2) a second port 150 (part of the inlet port for chamber/cavity 166) in fluid communication with the suction port 110 in the lower housing portion 106, and between which the seal member 136 is disposed; (3) a third port 152 (part of the inlet port for chamber/cavity 167) in fluid communication with the bypass port 114 in the lower housing portion 106, and between which the seal member 137 is disposed; and (4) a fourth port 154 which may function as an inlet connecting the aspirator-check valve assembly to a device requiring vacuum 102.

As shown in FIGS. 2 and 3, the upper housing portion 104 in both embodiments includes upper valve seats 125, 127. Each upper valve seat 125, 127 is defined by continuous outer wall 160, 161 and bottom wall 162, 163. Both upper valve seats 125, 127 may include a pin 164, 165 extending downwardly from the bottom walls 162, 163, respectively, toward the lower housing portion 106. The pins 164, 165 function as a guide for translation of the sealing members 136, 137 within the cavities 166, 167 defined by the mated upper valve seat 125 with the lower valve seat 124 and defined by the mated upper valve seat 127 with the lower valve seat 126. Accordingly, each sealing member 136, 137 includes a bore therethrough sized and positioned therein for receipt of the pin 164,165 within its respective cavity 166, 167.

Referring again to FIGS. 2 and 3, the passageway 144 in the lower housing portion 106 has an inner dimension along a central longitudinal axis that includes a first tapering portion 182 (also referred to herein as the motive cone) in the motive section 180 of the lower housing portion 106 coupled to a second tapering portion 183 (also referred to herein as the discharge cone) in the discharge section 181 of the lower housing portion 106. Here, the first tapering portion 182 and the second tapering portion 183 are aligned end to end (outlet end 184 of the motive section 180 to inlet end 186 of the discharge section 181). The inlet ends 188, 186 and the outlet end 184, 189 may be any circular shape, elliptical shape, or some other polygonal form and the gradually, continuously tapering inner dimension extending therefrom may define, but is not limited to, a hyperboloid or a cone. Some example configurations for the outlet end 184 of the motive section 180 and inlet end 186 of the discharge section 181 are presented in FIGS. 4-6 of co-pending U.S. patent application Ser. No. 14/294,727, filed Jun. 3, 2014, incorporated by reference herein in its entirety.

As seen in FIGS. 2 and 3, the first tapering portion 182 terminates at a fluid junction with suction port 110, which is in fluid communication therewith, and at this junction the second tapering portion 183 begins and extends away from the first tapering portion 182. The second tapering portion 183 is also in fluid communication with the suction port 110. The second tapering portion 183 then forms a junction with the bypass port 114 proximate the outlet end 189 of the second tapering portion and is in fluid communication therewith. The first and second tapering portions 182,183 typically share the central longitudinal axis of the lower housing portion 106.

Still referring to FIGS. 2 and 3, the second tapering portion 183 tapers gradually, continuously from a smaller dimensioned inlet end 186 to a larger dimensioned outlet end 189. The optional bypass port 114 intersects the discharge section 190 as described above to be in fluid communication with the second tapering section 183. The bypass port 114 may intersect the second tapering section 183 adjacent to, but downstream of the outlet end 189. The lower housing portion 106 may thereafter, i.e., downstream of this intersection of the bypass port, continue with a cylindrically uniform inner passage until it terminates at the discharge port 112. Each of the respective ports 108, 110, 112, and 114 may include a connector feature on the outer surface thereof for connecting the passageway 144 to hoses or other features in the engine.

When either of the aspirator-check valve assemblies 100, 100' are connected into an engine system, for example as illustrated in FIGS. 2 and 3, the check valves 111 and 120 functions as follows. As the engine operates, the intake manifold 172 draws air into the motive port 180, through passageway 144 and out the discharge port 112. This creates a partial vacuum in the check valves 111, 120 and passageway 146 to draw seals 136, 137 downward against the plurality of fingers 134, 135 (FIG. 2) or against the plurality of fingers 134 and the first sound attenuating member 192 (FIG. 3). Due to the spacing of fingers 134, 135 and/or the porous nature of the first sound attenuating member 192 fluid flow from passageway 144 to passageway 146 is allowed. The partial vacuum created by the operation of the engine serves in the vacuum assistance of at least the operation of the device requiring vacuum 102.

The air flow system in a typical internal combustion engine operates on the principle that as the engine operates, a partial vacuum is created which pulls air through the air intake port of the carburetor of fuel injector to aid in proper fuel combustion. This vacuum has been found to be useful in supplementing vacuum assist subsystems in the vehicle, particularly brakes, fuel vapor purging systems, automatic transmissions and most recently, air conditioners. Aspirator-check valve assemblies such as assemblies 100, 100' may provide a connection between the main airway and the subsystem and serve to inhibit back pressure from the subsystem from disturbing airflow through the main airway.

The fluid flow within the aspirator-check valve assemblies described above is generally classified as turbulent. This means that in addition to the bulk motion of the fluid flow, such as air, there are pressure waves traveling through the assembly and different natural frequencies can become excited thereby resulting in turbulence generated noise. The aspirator-check valve assemblies 100, 100' as seen in FIGS. 2 and 3 include one or more sound attenuating members, 192, 194, 196. The sound attenuating members 192, 194, 196 are placed within the flow path proximate, but downstream of the regions where turbulence generated noise is created. As seen in FIG. 2 the second sound attenuating member 194 is disposed proximate to or in the discharge port 112 because the discharge section 190 is one portion where such noise is created. Also in FIG. 2, the third sound attenuating member 196 is present and is disposed proximate to or in the fourth port 154 of passageway 146 because the flow path between the bypass port 114, check valve 120, and the fourth port 154 is one portion where such noise is created. As discussed above and illustrated in FIG. 3, the first sound attenuating member 192 is disposed within the cavity 167 of check valve 120, specifically seated within the lower valve seat 126.

The sound attenuating members 192, 194, 196 are porous such that fluid flow through and between the passageways 144, 146 is not restricted, but sound (turbulence generated noise) is attenuated. With reference to FIG. 2, the solid arrows represent the fluid flow within the aspirator-check valve assembly and the dashed arrows represent the path for travel of the turbulence generated noise. As depicted, there are two potential paths for the turbulence generated noise: (1) toward the engine intake manifold 172; and (2) toward, and the device requiring vacuum 102. To eliminate or reduce this noise the porous elements are proximate but downstream of the source of the turbulent noise. For example, the sound attenuating members may be positioned in the discharge port, the suction port, the bypass check valve passageway above the check valve, and or the suction check valve passageway above the check valve.

The check valves 111, 120 can also produce turbulent noise due to the flow therethrough. This noise would travel down either of the two connections. Sound attenuating members may be placed in either the inlet or outlet passageways, and/or both of the check valves 111, 120.

The sound attenuating members 192, 194, 196 are porous as explained above and can be made from a variety of materials including metals, plastics, ceramics, or glass. The sound attenuating members may be made from wire, woven or matted, sintered particles, fibers woven or matted, but are not limited thereto. The porous character of the sound attenuating members causes the noise pressure waves to attenuate by interfering with themselves, but should be of sufficient size and shape to not unduly restrict or interfere with fluid flow, for example, air flow. In one embodiment, the sound attenuating members 192, 194, 196 are not harmed (do not deteriorate) by operating temperatures of an engine based on placement of the aspirator in the engine system. Additionally, the sound attenuating members 192, 194, 196 are not harmed by the vibrations experienced during operating conditions of the engine.

Referring now to FIGS. 4A-4C, stand-alone check valves 202, 203 are shown that are independent of an aspirator assembly. The check valve 202 includes a housing 204 defining an internal cavity 206 having a pin 264 therein upon which is seated a sealing member 236 and defining a first port 210 in fluid communication with the internal cavity 206 and a second fluid port 212 in fluid communication with the internal cavity 206. The internal cavity 206 typically has larger dimensions than the first port 210 and the second port 212. In the illustrated embodiments, the first port 210 and the second port 212 are positioned opposite one another to define a generally linear flow path through the check valve 202, when the sealing member 236 is not present, but is not limited to this configuration. The portion of the housing defining the internal cavity 206 includes an internal first seat 214 upon which the sealing member seats when the check valve is closed and a second seat 216 upon which the sealing member seats when the check valve is open. In FIG. 4B, the second seat 216 is a plurality of radially spaced fingers 234 extending into the internal cavity 206 from an interior surface of the internal cavity that is more proximate the first port 210. In FIG. 4C, the second seat 216 is a face or surface of a first sound attenuating member 292.

As shown in FIGS. 4B and 4C, the check valves 202, 203 each include at least one sound attenuating member. As discussed above, the first sound attenuating member 292 (FIG. 4C) may be positioned in the internal cavity 206 and provide the second seat 216 for the sealing member 236. A second sound attenuating member 294 may be included as shown in FIG. 4B proximate or in the opening defining the outlet to the first port 210. A third sound attenuating member 296 may be included as shown in FIG. 4B proximate or in the opening defining the inlet of the second port 212. A check valve may include any one or more of these first, second, and third sound attenuating members 292, 294, 296. The sound attenuating members are porous and may be or include any of the materials as discussed above.

The first sound attenuating member 292 may be a disc of porous material having a generally central bore therethrough or a partial bore therein to receive the pin 264, but is not limited thereto. The second and third sound attenuating members 294, 296, may be generally cylindrical plugs of porous material, but are not limited thereto.

Figure 5C:
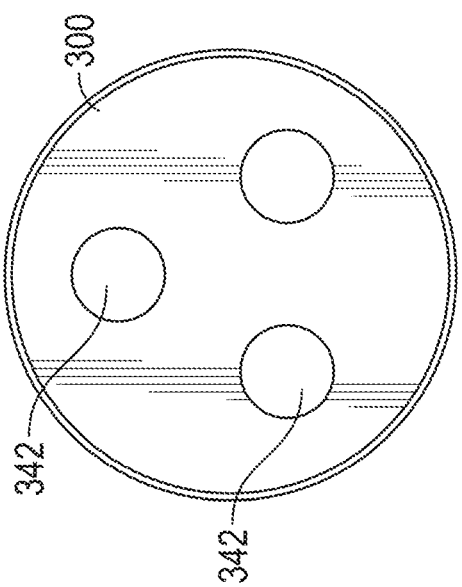
FIG. 5C is a top plan view of another embodiment of a sound attenuating member.
Figure 5B:
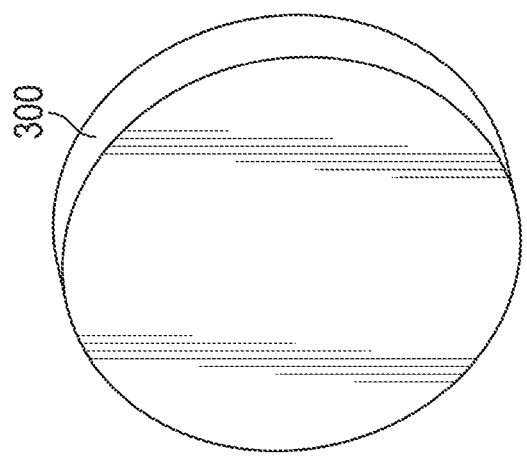
FIG. 5B is a top, perspective view of another embodiment of a sound attenuating member.

As seen in FIG. 5B any of the porous sound attenuating members in the embodiments described above may be a continuous plug of porous material with the only passageways therethrough being channels defined by its natural porosity, i.e., no enlarged bore holes are present. The continuous plug may be any shape and configuration to fit within the selected portion of the check valve or aspirator or other apparatus for generating vacuum, but as illustrated may be disc-shaped.

Figure 5A:
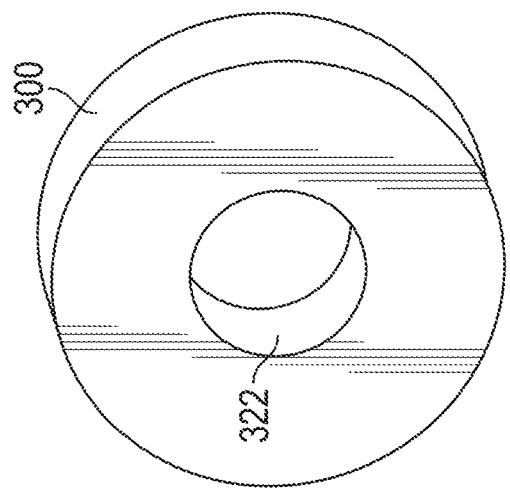
FIG. 5A is a top, perspective view of one embodiment of a sound attenuating member.

As seen in FIGS. 5A and 5C, the porous sound attenuating members, generally represented by reference number 300 in these figures, may include one or more bore holes 322, 342 therethrough. The bore holes provide the benefit of minimizing unwanted bulk flow restriction within any of the embodiments described herein. The bore holes 322, 342 may be circular in cross-section, but are not limited thereto. In another embodiment, the bore holes 322, 342 may be elliptical or polygonal in cross-section. Each bore hole has a generally central axis therethrough that is typically oriented generally parallel to the direction of the flow through the portion of the aspirator where the sound attenuating member 300 is disposed. As seen in FIG. 5A, if a single bore hole 322 is present it may be generally centrally positioned within the sound attenuating member 300, but is not limited thereto. The dimensions of the bore hole 322 are typically smaller than the internal dimensions of the upstream passageway adjacent to the sound attenuating member 300. When the bore hole 322 is circular in cross-section, the diameter of the bore hole 322 may be about 8 mm to about 14 mm. As seen in FIG. 5C, a plurality of bore holes 342 are present and are symmetrically positioned relative to one another within the porous sound attenuating member 300. These bore holes 342 may be circular in cross-section as shown, but are not limited thereto, and may be non-symmetrically arranged if desired. As described for FIG. 5A, here also, the dimensions of the bore holes 342 are smaller than the internal dimensions of the upstream passageway adjacent to the sound attenuating member 300. When bore holes 342 are circular in cross-section, the diameter of each may be about 3 mm to about 5 mm.

In one embodiment, the sound attenuating members 300 may be generally doughnut or toroidal in shape thereby having an inner diameter, an outer diameter and a thickness. The inner diameter may be the same or slightly larger than the flow path. The outer diameter and thickness are variable and are selected based on the required level of sound attenuation necessary during operating conditions. In one embodiment, any of the sound attenuating members may be made from a 0.05 mm diameter continuous strand of stainless steel wire that is woven into a cylindrical mesh, flattened and then wound to the selected outer diameter. The density of the weave may be about 0.24 mg/mm$^3$ to about 0.35 mg/mm$^3$. In one embodiment, the density of the weave is within this range and is about 0.3 mg/mm$^3$. A density of the weave within this range is achievable by varying the wire diameter, the structure of the weave, and the tension in winding the cylindrical mesh to the selected outer diameter.

The embodiments depicted in FIGS. 6A and 6B, 7A and 7B, and 8A and 8B are of alternate embodiments of aspirators 400, 401, and 402, respectively. Reference numbers identifying similar or the same components as described for FIGS. 1-3 are used in these figures as well. Each of these aspirators 400, 401, 402 include a porous sound attenuating member 300 within passage way 144 downstream of the bore 132 of a Venturi portion and disposed in the discharge section 181 (the outlet port of chamber 166). So, as seen in FIGS. 6B, 7B, and 8B, the sound attenuating member 300 is after the bore 132 and before the bypass port 114. The sound attenuating member is shown to be the sound attenuating member of FIG. 5A, but of course is not limited thereto.

The embodiment of FIGS. 6A and 6B has three primary housing pieces: (1) the upper housing 104 as described above and the lower housing 106 described above, but split into a (2) Venturi portion 106a and (3) a bypass portion 106b. The Venturi portion 106a includes a motive port 108 that may include a hose connector 410 on the outer exterior surface defining the motive port 108, a motive cone 182, a suction Venturi 132, the lower half of the check valve 111, specifically the lower valve seat 124, and a discharge cone 183 terminating in a first canister portion 412. The bypass portion 106b includes a second canister portion 414 matable with the first canister portion 412 to enclose the sound attenuating member 300 in an enclosed chamber 420 defined by canister 416 formed when the first and second canister portions 412, 414 are mated together. The bypass portion 106b also includes a bypass port 114 and the lower half of the check valve 120, specifically the lower seat 126, and discharge port 112 that may include a hose connector 418 on the outer exterior surface defining the discharge part 112.

When the upper housing 104 and the Venturi portion 106a and the bypass portion 106b are assembled, a first check valve disc 136 is seated in check valve 111 and a second check valve disc 137 is seated in check valve 120.

The embodiment of FIGS. 7A and 7B, similar to the embodiment of FIGS. 6A and 6B, has three primary housing pieces: (1) the upper housing 104, and the lower housing 106 described above, but split into a (2) Venturi portion 106a' and (3) a bypass portion 106b'. The Venturi portion 106a' is the same as disclosed in FIG. 6B except that upstream of where the discharge cone 183 terminates in a first canister portion 412, a collar 424 extends radially outward from the exterior surface of the discharge cone 183. As seen in FIG. 7B, the collar 424 is positioned between the bore 132 and the first canister portion 412. The bypass portion 106b' is the same as disclosed in FIG. 6B except that the second canister portion 414' is configured to extend beyond the first canister portion 412 to mate to or be coupled to the collar 424. When the first canister portion 412 and the second canister portion 414' are mated together they enclose a sound attenuating member 300 therebetween in an enclosed chamber 420' and also form a second chamber 426 located between the collar 424 and the first canister portion 412. When assembled, the canister 417 is dual chambered having the second chamber 426 surrounding the outside of the discharge cone 183 upstream from the first chamber 420 housing the sound attenuating member 300.

Referring now to FIG. 7B, the second chamber 426 contains air and may be sealed to contain the air or may be in fluid communication with ambient air surrounding the aspirator 401. In another embodiment (not shown), the second chamber 426 may include a second sound attenuating member, which may be a porous material that does or does not include bore holes such as those shown in FIGS. 5A and 5C. When assembled, the aspirator 401 also includes, a first check valve disc 136 seated in check valve 111 between the upper housing 104 and the Venturi portion 106a' and a second check valve disc 137 seated in check valve 120 between the upper housing 104 and the bypass portion 106b'.

Additionally, as shown in FIG. 7B, the bypass portion 106b' includes one or more fingers 490 extending into the bore 322 of the sound attenuating member 300 at a position that places the fingers generally against a surface thereof that defines the outermost diameter or dimension of the bore 322. If a plurality of fingers 490 are present, they may be equally distant apart from adjacent neighboring fingers 490. The one or more fingers 490 provide the advantage of maintaining the sound attenuating member in its install position and to reduce deformation of the material during operating conditions of the system. While the finger 490 is shown as part of the bypass portion 106b', in another embodiment, the fingers could instead extend from the Venturi portion 106a'.

The embodiment of FIGS. 8A and 8B is essentially the embodiment of FIGS. 6A and 6B, but divided into two subassemblies 430, 440, one of which includes a sound attenuating canister 458, joinable into fluid communication by one or more hoses 450. The embodiment of FIGS. 7A and 7B could also be divided into two subassemblies as well in a similar fashion even though not illustrated in the figures. The subassemblies include a Venturi subassembly 430 and a bypass subassembly 440.

The Venturi subassembly 430 includes a first upper housing portion 432 that includes the upper valve seat 125 as described above and a lower Venturi portion 106 as described in FIG. 6B, which terminates with a first canister portion 412. When the first upper housing portion 432 is mated to the lower Venturi portion 106, a first check valve disc 136 is seated between the upper valve seat 125 and the lower valve seat 126 to form check valve 111. The Venturi portion 106a includes a motive port 108 that may include a hose connector 410 on the outer exterior surface defining the motive port 108, a motive cone 182, a suction Venturi 132, the lower half of the check valve 111, specifically the lower valve seat 124, and a discharge cone 183 terminating in a first canister portion 412. Connectable to the lower Venturi portion 106 is a canister cap 460 comprising a second canister portion 462 and a connector portion 464 having hose connecting features 466 on its exterior surface. The second canister portion 462 is matable with the first canister portion 412 to enclose the sound attenuating member 300 in an enclosed chamber 470 formed therebetween when the first and second canister portions 412, 414 are mated together.

As illustrated in FIGS. 8A and 8B, the first upper housing 430 may include a first stabilizing member 480 facing the lower Venturi portion 106 and positioned to mate with a second stabilizing member 482 included as part of the lower Venturi portion 106. The assembled aspirator 402 has the first stabilizing member 480 mated with the second stabilizing member 482 to stiffen and strengthen the aspirator, in particular the half of the aspirator having the sound attenuating canister 458.

The bypass subassembly 440 includes a second upper housing portion 434 and a lower bypass portion 106c. The second upper housing portion 434 includes an upper valve seat 125 defining, as described above, a portion of check valve 120 and the third port 152, which is in fluid communication with the bypass port 114 in the lower bypass housing portion 106c. The second upper housing portion 434 also includes a conduit 472 having a fifth port 474 connectable to a sixth port 436 of the first upper housing portion 432 by a hose 450. The upper bypass housing portion 434 also includes the fourth port 154, described above, which may function as an inlet connecting the aspirator-check valve assembly 402 to a device requiring vacuum. The lower bypass housing portion 106c includes the bypass port 114', the lower half of the check valve 120, specifically the lower valve seat 126, and the discharge port 112 that may include a hose connecting features 418 on its outer exterior surface.

As shown in FIG. 8B, the canister cap 460 includes one or more fingers 490' extending into the bore 322 of the sound attenuating member 300 at a position that places the fingers generally against a surface thereof that defines the outermost diameter or dimension of the bore 322. If a plurality of fingers 490' are present, they may be equally distant apart from adjacent neighboring fingers 490'. The one or more fingers 490' provide the advantage of maintaining the sound attenuating member in its install position and to reduce deformation of the material during operating conditions of the system. While the finger 490' is shown as part of the canister cap 460, in another embodiment, the fingers could instead extend from the Venturi portion 106a.

The advantage of each of the various embodiments herein is that the noise generated, typically from turbulent flow through the device and the operation of the Venturi portion and/or the check valves, is reduced. This is beneficial to a user who expects a quiet operating system.

Having described the invention in detail and by reference to preferred embodiments thereof, it will be apparent that modifications and variations are possible without departing from the scope of the invention which is defined in the appended claims.

What is claimed:

1. A check valve unit comprising:
   a housing defining an inlet port, an outlet port, and a chamber in fluid communication with the inlet port and the outlet port thereby defining a flow path from the inlet port through the chamber to the outlet port, wherein the chamber is defined between a first valve seat and a second valve seat;
   a sealing disc disposed within the chamber and moveable within the chamber between a position seated on the first valve seat to a position seated on the second valve seat only in response to a pressure difference across the sealing disc itself; and
   a sound attenuating member disposed in the flow path downstream of the chamber, disposed within the chamber, or both.

2. The check valve unit of claim 1, wherein the sound attenuating member includes a porous material that attenuates noise pressure wave by interference.

3. The check valve unit of claim 1, wherein the sound attenuating member is heat resistant to temperatures in an internal combustion engine.

4. The check valve unit of claim 1, wherein the sound attenuating member is a continuous plug of porous material.

5. The check valve unit of claim 1, wherein the sound attenuating member has one or more bore holes passing therethrough that are generally aligned with the direction of the flow in the flow path.

6. The check valve unit of claim 1, wherein a first sound attenuating member is disposed in the flow path proximate the inlet port and a second sound attenuating member is disposed in the flow path proximate the outlet port.

7. The check valve unit of claim 1, wherein a first sound attenuating member is disposed in the chamber and forms either the first valve seat or the second valve seat and a second sound attenuating member is disposed in the flow path proximate the outlet port.

8. A check valve unit comprising:
   a housing defining an inlet port, an outlet port, and a chamber in fluid communication with the inlet port and the outlet port thereby defining a flow path from the inlet port through the chamber to the outlet port, wherein the chamber includes a first valve seat and a second valve seat;
   a sealing member disposed in the chamber and moveable from a position seated on the first valve seat to a position seated on the second valve seat;
   a sound attenuating member disposed in the flow path downstream of the chamber, disposed within the chamber, or both; and
   a Venturi portion having a fluid junction with the outlet port for fluid communication therewith.

9. The check valve unit of claim 1, wherein a first sound attenuating member is disposed in the flow path proximate the outlet port.

10. The check valve unit of claim 9, wherein a second sound attenuating member is disposed in the flow path proximate the inlet port.

11. The check valve unit of claim 9, wherein a second sound attenuating member is disposed in the chamber.

12. A check valve unit comprising:
    a housing defining an inlet port, an outlet port, and a chamber in fluid communication with the inlet port and the outlet port thereby defining a flow path from the inlet port through the chamber to the outlet port, wherein the chamber includes a first valve seat and a second valve seat;
    a sealing member disposed in the chamber and moveable from a position seated on the first valve seat to a position seated on the second valve seat;
    a sound attenuating member disposed in the flow path downstream of the chamber, disposed within the chamber, or both; and
    a Venturi portion in fluid communication with the chamber, wherein a discharge section of the Venturi portion defines the outlet port of the chamber, and the sound attenuating member is disposed in the discharge section.

13. The check valve unit of claim 12, wherein the housing further defines:
    a second chamber having a second inlet port and a second outlet port in fluid communication therewith thereby defining a flow path from the inlet port through the chamber to the outlet port, wherein the second chamber includes a first valve seat and a second valve seat;
    a sealing member disposed in the second chamber that is moveable from a position seated on the first valve seat to a position seated on the second valve seat; and
    wherein the outlet port of the second chamber has a fluid junction with the discharge section of the Venturi portion downstream of the sound attenuating member.

14. The check valve unit of claim 12, wherein the sound attenuating member includes a porous material that attenuates noise pressure wave by interference.

15. The check valve unit of claim 12, wherein the sound attenuating member is heat resistant to temperatures in an internal combustion engine.

16. The check valve unit of claim 12, wherein the sound attenuating member is a continuous plug of porous material.

17. The check valve unit of claim 12, wherein the sound attenuating member has one or more bore holes passing therethrough that are generally aligned with the direction of the flow in the flow path.

18. The check valve unit of claim 12, wherein the discharge section includes a canister to house the sound attenuating member, wherein the canister comprises a first canister portion as part of the discharge section of the Venturi portion that defines a seat for the sound attenuating member and a second canister portion that is mated to the first canister portion to enclose the sound attenuating member in a first chamber of the canister.

19. The check valve unit of claim 18, wherein the canister is a dual chambered canister that forms a second chamber surrounding at least a portion of the discharge section of the Venturi portion upstream from the first chamber.

20. The check valve unit of claim 19, wherein the discharge section includes a collar extending outward therefrom at a position upstream from the first canister portion, wherein the collar is mated with the second canister portion thereby defining the second chamber.

21. A check valve unit comprising:
a housing defining an inlet port, an outlet port, and a chamber in fluid communication with the inlet port and the outlet port thereby defining a flow path from the inlet port through the chamber to the outlet port, wherein the chamber is defined between a first valve seat and a second valve seat;
a sealing disc disposed within the chamber and moveable within the chamber between a position seated on the first valve seat to a position seated on the second valve seat, wherein the sealing member moves to an open position in response to fluid flow from the inlet port to the outlet port; and
a sound attenuating member disposed in the flow path downstream of the chamber, disposed within the chamber, or both;
wherein a first sound attenuating member is disposed in the flow path proximate the inlet port or the first sound attenuating member is disposed in the chamber and forms either the first valve seat or the second valve seat, and a second sound attenuating member is disposed in the flow path proximate the outlet port.

* * * * *